March 1, 1949.    P. A. WILLIAMS    2,463,132
APPARATUS FOR MAKING WHISTLES
Filed Feb. 23, 1945
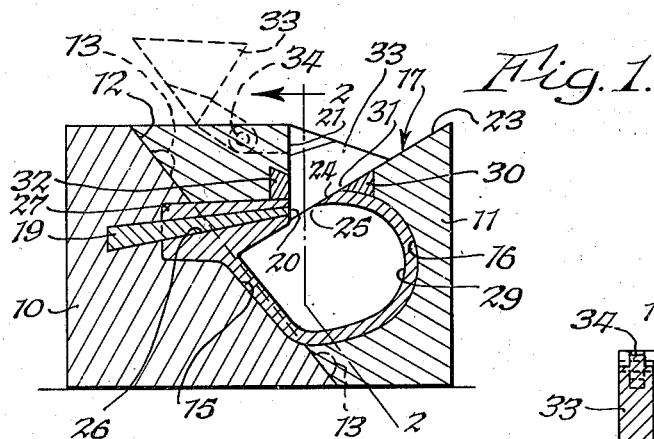
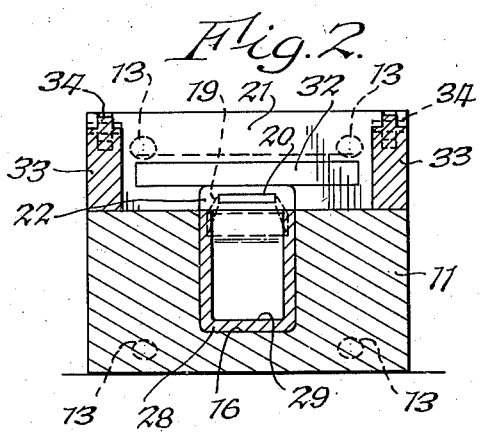
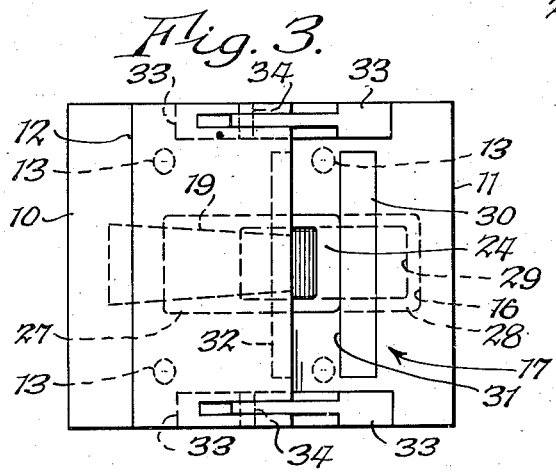
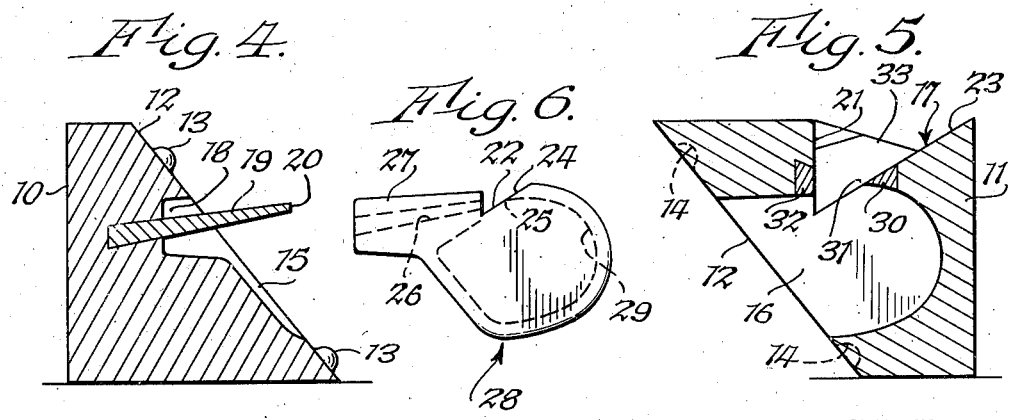
INVENTOR.
Paul A. Williams
BY
Parker Prochnow & Farmer
Attorneys

Patented Mar. 1, 1949

2,463,132

UNITED STATES PATENT OFFICE

2,463,132

APPARATUS FOR MAKING WHISTLES

Paul A. Williams, West Seneca, N. Y., assignor to Glenn Confections, Inc., Buffalo, N. Y.

Application February 23, 1945, Serial No. 579,465

7 Claims. (Cl. 18—39)

This invention relates to an apparatus for making whistles.

Molded whistles are not new, as such, and have been made by both solid molding and flush molding, but heretofore, flush molded whistles were never finished and ready to use after having only the usual flush molding operations performed upon them. In addition to the usual flush molding operations it was necessary to perform additional operations, such as, to "pick out" wax from the whistle opening in addition to the separate operation of removing the excess solidified material. In previous flush molded whistles the liquid was not placed in or flushed out of the mold through the whistle opening, nor have finished whistles by either solid or flush molding methods been previously molded in a mold made only of two parts.

An object of the invention is to improve, and simplify into a lesser number of operations, the molding of whistles by flush molding.

Another object of the invention is to provide an improved mold for use in the flush molding of whistles from thermoplastic materials, which will be relatively simple, with which finished whistles may be quickly, easily and inexpensively formed with a minimum of operations, from which the molded and finished whistles may be easily removed, with which the edge against which the air current impinged to set up air vibrations may be sharp, accurately and quickly formed, and which will be simple, easily manipulated and inexpensive.

Other objects and advantages of the invention will be apparent from the following description of one embodiment of the invention, and the novel features will be particularly pointed out hereinafter in connection with the appended claims.

In the accompanying drawings:

Fig. 1 is a longitudinal, sectional elevation through a mold constructed in accordance with this invention, with a whistle molded therein by flush molding and ready to be removed;

Fig. 2 is a transverse, sectional elevation of the same, the section being taken approximately along the line 2—2 of Fig. 1;

Fig. 3 is a plan of the mold;

Fig. 4 is a view of one section of the mold, with the other section separated and the whistle removed;

Fig. 5 is a sectional, elevation through the other, separated section of the mold, with the whistle removed; and Fig. 6 is a side elevation of the removed molded whistle.

In the illustrated embodiment of the invention the improved mold body is formed of two sections 10 and 11 which abut face to face along a parting face or line 12 which extends obliquely between the upper and lower faces, at zones intermediate opposite edges of those faces. The section 10 has spaced pins 13 on the parting face 12 which, when the sections are brought together, engage in correspondingly positioned recesses 14 in the parting face 12 of the section 11 to position the sections properly together. The mold body has, in its interior, at the parting face 12, a mold cavity representing the outside of a whistle to be molded, one part 15 of this cavity being defined in the section 10, and the other part 16 in the other mold section 11. One of the sections, such as the section 11, is provided with a V-shaped notch 17 which intersects and extends substantially into the cavity part 16 in the section 11.

The cavity part 15 in the section 10 has a relatively deeper portion 18 in which the outer end of the whistle mouthpiece is formed, and in this portion 18 is disposed a core 19 which extends from the inner end wall of the cavity portion 18 in a direction representing the desired air-passage of the whistle, well beyond the parting face 12 until it meets or intersects the notch 17 when the mold sections are assembled as shown in Fig. 1. This core 19 extends into, and is anchored in, the body of the mold section 10, so that when the mold sections are pulled apart, the core 19 will always remain with the section 10. The free end face 20 of the core 19 terminates in the plane of one wall 21 of the notch 17.

When the mold sections are assembled or brought together, as shown in Figs. 1 to 3, and securely clamped in assembled relation by any suitable clamping means (not shown) with the notch 17 uppermost, the thermo-plastic molding material, such as any of the materials or waxes commonly used for flush molding, is poured in liquid condition into the chilled mold cavity through the notch 17 until the cavity is entirely filled to a level above the entrance to the cavity and up into notch 17. The mold may then be chilled or allowed to stand until the molding material congeals or sets sufficiently to form a shell of the desired thickness of wall. The shell begins to form by a cooling of the layer in contact with the cavity wall, and increases in thickness as the molding material cools. The core 19 also cools the molding material surrounding it, which builds up the mouthpiece portion of the whistle.

When a whistle shell has been formed to the desired thickness, as shown in Fig. 1, the mold is inverted and the still liquid portion of the molding material is poured out. This is commonly known as flush molding. While the mold sections are still together, a sharp knife or tool is moved along both side walls of the notch 17, with the blade of the knife flat against the notch wall along which it is moving, and this movement of the knife cuts the excess solidified material or wax from the whistle body in the notch 17 so as to form, in the whistle, by sharply defined lines, the whistle notch or opening 22, Fig. 6.

The blade, in moving along the inclined wall 23 of the notch 17, cuts a bevelled surface or face 24 in the whistle shell with a sharp free edge 25 in line with the axis of the air passage 26 formed in the whistle mouthpiece 27 by the core 19. The blade, in moving along the vertical or upright wall 21 of notch 17, cuts off the solidified material or wax which had formed on the free end face of the core 19, which serves to open the air passage through the mouthpiece. The mold sections are then separated which exposes the molded, finished whistle 28, shown separately in Fig. 6. The whistle is then removed from whichever mold section it adheres to.

When one directs a current of air along the passage 26 toward the whistle opening 22, this air current will strike the sharp edge 25 and be set into vibration thereby, which creates the whistling sound. The chamber 29, within the whistle body 28, acts as a resonator chamber to amplify the sounds or whistle created by the air current striking the sharp edge 25 and thus a loud whistling sound is created. This is the usual action of a whistle and it is explained here merely to illustrate how the whistle body formed in this manner has all the characteristics of a typical whistle.

After the molded whistle has been removed from the cavity, the mold sections can be reassembled, and other whistles molded in the same cavity by the same procedure. The sections 10 and 11 of the mold body can be made of any suitable material, but is preferably a material to which the whistle will not stick, or the cavity is lined with a material to which the molding material will not stick.

If desired, the mold section 11 may have a bar 30 formed therein to form the edge 31 of the mold, since that edge, because of its sharpness, would be rather fragile and easily broken off if the material of which the mold section 11 is made is at all fragile. The bar 30 gives the necessary strength to the mold section and also guides the cutting blade along the wall 23 of the notch 17 to cut the material or wax and form the sharp edge 25 of the whistle. Similarly another re-enforcing bar 32 may be provided in the vertical wall 21 of the notch 17 at the corner edge where the wall 21 intersects the cavity, so as to reinforce the mold at a corner and to guide the knife in cutting the whistle opening 22 at the end of the air passage.

In order to prevent the liquid molding material or wax from running out of the ends of notch 17 during the filling of the mold and while the material or wax is setting, a dam 33 is disposed in the notch at each side of the opening into the cavity 16. This allows the liquid level in the notch 17 to rise above the edge 31 of the bar 30. These dams 33 are removable so that a knife may be passed along each of the walls 21 and 23 of the notch, or a V-shaped knife fitting the notch may be passed along both walls at the same time. In production, the mold body will have a plurality of the molding cavities 15—16 therein opening into the same notch 17 and arranged side by side in spaced relation, but in close proximity to each other, and the dams at the ends of the notch of the mold body will serve for all of the mold cavities.

These dams may be made removable in any suitable manner, or movable to clear the notch so that a tool may be passed along the notch for its full length to cut the material or wax and form the whistle openings 22 for all of the whistles molded at the same time in the same mold body. One suitable way of mounting the dams is to connect them by hinges 34 to the mold body so that they will normally be held by their own weight in effective position but may be swung into the inoperative position shown in dash lines in order to clear the notch 17 for movement therealong of the cutting tool.

It will be understood that all of the cavity walls and the core 19 are properly tapered to facilitate the removal of the completed whistle 28 from the cavity walls and from the core, as usual in molding operations.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A mold for use in making whistles by the flush method of molding which comprises a mold body formed of two abutting sections having a parting face, said body having a mold cavity therein intersected by said parting face, with the cavity walls determining the outside shape of a whistle, and a single opening leading to said cavity at the portion thereof corresponding to the whistle air vent and forming the sole entrance to said cavity when the sections are together, and a core carried by one wall of the cavity at the mouthpiece end of the cavity and projecting therefrom in spaced relation to the walls of the cavity toward said opening and having its free end edge face disposed substantially in the extended plane of the first side wall of the opening which it meets, the longitudinal axis of said core, if extended, passing adjacent to, but immediately below the intersection of the opposite side wall of the opening into said cavity, whereby the molding material in fluid condition may be added to said cavity through said opening, and after the material has set on said walls to a desired extent, the still liquid portion of said molding material can be poured out of the mold through said opening.

2. A mold for use in making by the flush method of molding, whistles of the type having a tubular mouthpiece leading to a resonant chamber therein and a vent at the junction of the passage of this mouthpiece and said chamber, which comprises a mold body formed of two abutting sections having a parting face which is transverse to the longitudinal axis of said mouthpiece, said body having therein a mold cavity intersected by said parting face, with the cavity walls determining the outside shape of a whistle, and a single opening in one of said sections leading to said cavity at the portion thereof corresponding to said whistle air vent and forming the sole entrance to said cavity when said sections are together to form the body, and a core carried by the other of said sections and projecting from a wall of said cavity at the portion determining the free end of the mouthpiece, in spaced relation to those walls of the cavity determining the mouthpiece along the desired passage of the mouthpiece substantially to said single opening.

3. A mold for use in making, by flush molding, a whistle of the type having a hollow barrel, a tubular mouthpiece projecting from said barrel, and a vent at approximately the junction between the passage of the mouthpiece and the chamber of said barrel, which comprises a mold body formed of two abutting complementary sections having a parting face which is transverse to the longitudinal axis of said mouthpiece, said body having therein a mold cavity representing the desired exterior of said whistle and intersected by said parting face, and also having in one section a single opening leading from the exterior of said body to said cavity at the portion thereof which determines the whistle air vent and forming the sole entrance to said cavity when the sections are together to form the body, and a core carried by the other of said sections at the portion determining the free end of the mouthpiece, projecting into said cavity in the portion thereof representing the desired passage of said mouthpiece, and extending approximately to said single opening.

4. A mold for use in making whistles by the flush method of molding which comprises a mold body formed of two abutting sections having a parting face, said body having a mold cavity therein intersected by said parting face, with the cavity walls determining the outside shape of a whistle, and a single opening leading to said cavity at the portion thereof corresponding to the whistle air vent and forming the sole entrance to said cavity when the sections are together, and a core carried by one wall of the cavity at the mouthpiece end of the cavity and projecting therefrom in spaced relation to the walls of the cavity toward said opening and having its free end edge face disposed substantially in the extended plane of the first side wall of the opening which it meets, the longitudinal axis of said core, if extended, passing adjacent to, but immediately below the intersection of the opposite side wall of the opening into said cavity, whereby the molding material in fluid condition may be added to said cavity through said opening, and after the material has set on said walls to a desired extent, the still liquid portion of said molding material can be poured out of the mold through said opening, said first side wall of said opening and the side wall of said opening opposite thereto forming between them an acute dihedral angle, the apex of which is within said cavity.

5. A mold for use in making, by flush molding, a whistle of the type having a hollow barrel, a tubular mouthpiece projecting from said barrel, and a vent at approximately the junction between the passage of the mouthpiece and the chamber of said barrel, which comprises a mold body formed of two abutting, complementary sections having a parting face which is transverse to the longitudinal axis of said mouthpiece, said body having therein a mold cavity representing the desired exterior of said whistle and intersected by said parting face, and also having in one section a single opening leading from the exterior of said body to said cavity at the portion thereof which determines the whistle air vent and forming the sole entrance to said cavity when the sections are together, to form the body, and a core carried by the other of said sections at the portion determining the free end of the mouthpiece, projecting into said cavity in the portion thereof representing the desired passage of said mouthpiece, and extending approximately to said single opening, opposite walls of said opening being approximately in flat planes forming between them an acute dihedral angle, the opening wall nearest said mouthpiece being approximately normal to the longitudinal axis of said core and approximately at the free end of said core.

6. A mold for use in making whistles by the flush method of molding which comprises a mold body formed of two abutting complementary sections having a parting face, said body having a mold cavity therein intersected by said parting face, with the cavity walls determining the outside shape of a whistle, and a V-shaped channel extending across the top of said body from side to side and intersecting said cavity where the vent of the whistle is desired, with the apex of the V within said cavity, the intersection of the channel with the cavity forming the sole entrance to said cavity when the sections are together to form said body, and a core carried by the wall of the cavity determining the mouthpiece of the whistle and projecting into the cavity in spaced relation to the cavity walls and terminating approximately at the channel.

7. A mold for use in making, by flush molding, whistles of the type having a tubular mouthpiece leading to a resonant chamber and a vent at the juncture of the mouthpiece and said chamber, which comprises a mold body formed of two abutting complementary sections having a parting face which is transverse to the longitudinal axis of said mouthpiece, said body having therein a mold cavity representing the exterior of the whistle and intersected by said parting face, and also having a single opening leading from the exterior of the body to said cavity where the whistle vent is desired, said opening being formed by a V-shaped channel extending in a direction generally crosswise of said longitudinal axis, intersecting said cavity and having the bottom of the V of the channel intersecting said chamber, said channel extending at both of its ends beyond said cavity.

PAUL A. WILLIAMS.

REFERENCES CITED

The following references are of record in the file of this patent:

UNITED STATES PATENTS

| Number | Name | Date |
|---|---|---|
| 119,392 | Neuhausen | Sept. 26, 1871 |
| 229,163 | Mills | June 22, 1880 |
| 267,562 | Mills | Nov. 14, 1882 |
| 282,451 | Furman | July 31, 1883 |
| 1,428,733 | Wilson | Sept. 12, 1922 |
| 1,688,417 | Grubman | Oct. 23, 1928 |
| 1,695,001 | Wood | Dec. 11, 1928 |
| 2,061,134 | Schwarz | Nov. 17, 1936 |
| 2,218,091 | Marinsky et al. | Oct. 15, 1940 |
| 2,248,060 | Brundage | July 8, 1941 |
| 2,400,482 | Brannon et al. | May 21, 1946 |

OTHER REFERENCES

British Plastics, Injection Molding of Thermosetting Materials, April 1939.